United States Patent [19]

Banfield et al.

[11] Patent Number: 5,286,431
[45] Date of Patent: Feb. 15, 1994

[54] MOLDED PRODUCT HAVING INSERT MOLD-IN FASTENER

[75] Inventors: Donald L. Banfield, Hudson; Gerald F. Rocha, Bedford, both of N.H.

[73] Assignee: Velcro Industries, B.V., Amsterdam, Netherlands

[21] Appl. No.: 976,544

[22] Filed: Nov. 16, 1992

Related U.S. Application Data

[62] Division of Ser. No. 695,183, May 3, 1991.

[51] Int. Cl.$^5$ .............................................. B29C 33/16
[52] U.S. Cl. ..................................... 264/134; 264/464; 264/274; 264/275; 264/317; 427/154
[58] Field of Search ............... 264/46.4, 134, 271.1, 264/274, 275, 277, 317; 24/444; 428/100; 427/128, 154, 155

[56] References Cited

U.S. PATENT DOCUMENTS

| | | | |
|---|---|---|---|
| 2,643,158 | 6/1953 | Baldanza | 425/112 |
| 4,470,857 | 9/1984 | Casalou | 264/46.4 |
| 4,563,380 | 1/1986 | Black et al. | 24/444 |
| 4,693,921 | 9/1987 | Billarant et al. | 24/444 |
| 4,784,890 | 11/1988 | Black | 24/444 |
| 4,792,111 | 12/1988 | Taguchi | 425/127 |
| 4,842,916 | 6/1989 | Ogawa et al. | 24/444 |
| 4,931,344 | 6/1990 | Ogawa et al. | 24/444 |
| 5,061,540 | 10/1991 | Cripps et al. | 24/444 |
| 5,171,395 | 12/1992 | Gilcreast | 156/245 |
| 5,180,618 | 1/1993 | Kessler et al. | 24/444 |

FOREIGN PATENT DOCUMENTS

0439969A1 8/1991 European Pat. Off. .
2405123 5/1979 France .

*Primary Examiner*—Jay H. Woo
*Assistant Examiner*—Robert B. Davis
*Attorney, Agent, or Firm*—Fish & Richardson

[57] ABSTRACT

A fastener of the hook and loop type intended to be incorporated into plastic articles by plastic molding processes is formed of a known separable fastener member having a base member and a plurality of engaging elements upstanding from one surface thereof. A covering which intimately surrounds the individual engaging elements protects the elements when exposed to the harsh environment of a molding process. This protecting covering is removable from the fastener after the molding process to expose the engaging elements without substantially destroying the performance thereof.

12 Claims, 7 Drawing Sheets

MOLDED PRODUCT HAVING INSERT MOLD-IN FASTENER

This is a divisional of copending application Ser. No. 07/695,183 filed on May 5, 1991.

BACKGROUND OF THE INVENTION

This invention relates to an improved device and method for adapting separable fasteners, particularly those of the hook and loop type, for attachment to other objects such as poly(urethane) foam seat cushions or hard plastic parts for automobiles, furniture and the like. In this method one portion of a separable fastener is incorporated into the plastic object during the molding process for subsequent attachment to another object carrying the mating portion of the separable fastener. The fastener of this invention provides a greater degree of design flexibility as to the shape and especially as to types of plastic into which the part may be molded.

DESCRIPTION OF THE PRIOR ART

Hook and loop separable fasteners, such as those sold by the assignee of this application under the trademark "VELCRO" are well known and used to join two members detachably to each other. This type fastener has two components. Each has a flexible substrate or base having one component of the fastening system on the surface thereof. One surface is typically comprised of resilient hooks while the other is comprised of loops. When the two surfaces are pressed together they interlock to form a releasable engagement. Separable fasteners have in recent years been used in the manufacture of automobile seats in the attachment of an upholstered seat cover, hereinafter called trim cover, to a poly(urethane) foam bun. One portion of the separable fastener is incorporated into the surface of the poly(urethane) seat bun during the foam molding process. The mating portion of the separable fastener is attached to the seat cover to provide releasable attachment to the foam seat bun. The separable fastener assembly used in the foam mold for incorporation in the bun surface typically comprises the hooked portion of the separable fastener system. This hook portion is characterized by a base carrying resilient hooks on one surface. The outer surface of the base may act as an anchoring surface by a variety of methods well known in the art. In some assembles a magnetizable shim is attached to the base to facilitate placement of the assembly in a trough of the mold cavity wall, which is equipped with magnets. A protective layer, usually in the form of a thin plastic film, is placed over the resilient hooks to prevent incursion of foams into the hooks during the molding process. Significant foam contamination of the hooks would affect their ability to engage with the mating portion of the fastener. Such fastening devices are applied to one surface of a clamshell mold; a chemical mixture, usually of a diisocyanate and a polyol, are injected into a mold; the upper surface of the mold is closed and clamped shut while the chemicals react and blow to form a flexible foam, well known in the art. The present state of the art relating to the attachment of such fastener means to foamed seat cushions and the like is generally represented by French patents 2,405,123 and 2,423,666 as well as the following U.S. Pat. Nos.:

U.S. Pat. No. 4,470,857, issued Sept. 11, 1984 in the name of Stephen J. Casalou and assigned to R. A. Casalou, Inc.;

U.S. Pat. No. 4,563,380, issued Jan. 7, 1986 in the name of Philip D. Black and assigned to Minnesota Mining and Manufacturing Company;

U.S. Pat. No. 4,673,542, issued Jun. 16, 1987 in the name of Lauren R. Wigner and assigned to General Motors Corporation;

U.S. Pat. No. 4,693,921, issued Sept. 15, 1987 in the name of Patrick J. Billarant and Bruno Queval and assigned to Aplix;

U.S. Pat. No. 4,710,414, issued Dec. 1, 1987 in the name of Walter E. Northup and Maurice E. Freeman and assigned to Minnesota Mining and Manufacturing Company;

U.S. Pat. No. 4,726,975, issued Feb. 23, 1988 in the name of Richard N. Hatch and assigned to Actief N.V. ABN Trust Co ; and U.S. Pat. No. 4,842,916 issued Jun. 27, 1989 to Kunihiko Ogawa et al assigned to Kuraray Company Ltd., Kurashiki, Japan.

Such mold-in separable fastener assemblies presently in use, while proving to be superior means of attaching a seat cover to a foam bun, have limitations. One disadvantage of the separable fastener assemblies of the type disclosed in U.S. Pat. No. 4,673,542 is that the thin plastic film layer used to cover the hooks is light and flimsy thus limiting the degree of protection offered to the hooks against high pressure or temperature. Such devices are therefor unable to be used for molding hooks into hard plastic using a standard injection molding machine where the high temperature of the molten plastic has a tendency to melt the hooks or the high pressure of the plastic during the injection process is capable of crushing the hooks.

Other prior-art assemblies, including those disclosed in U.S. Pat. Nos. 4,726,975, 4,563,380 and 4,693,921 also employ a thin layer of film to prevent the incursion of foam into the fastener elements of the separable fastener during molding. French Patent No. 2,423,666 discloses a system for sealing the edges of the tape in the mold trough by jamming the edges of the fastener into the trough. None of these methods provides protection for the hooks against high temperature or pressure which will destroy hooks during the molding operation. U.S. Pat. No. 4,562,032 incorporates a soft lining as an integral portion of the mold cavity surface to protect the grain of a thin grained face of a vinyl sheet but the patent literature is generally devoid of teachings which protect large proturberances on plastic mold inserts from the rigors of the injection or compression molding process. In fact the patent literature repeatedly recommends the melting temperature of the insert part be greater than the processing temperature of the injecting molten polymer. Such teachings are contained in U.S. Pat. No. 2,643,158 directed to a method of molding brushes. At section 4, line 60–63, "In general the materials should be selected so that the strands or tufts shall not be caused to deteriorate by the molding heat". Those skilled in the art understand it is not advisable to insert plastic into injection molds or into compression molds at temperatures greater than the distortion temperature of the insert part. In some cases methods are used for cooling a portion of the mold containing a meltable insert. Such systems are cumbersome, expensive and difficult to use.

U.S. Pat. No. 2,923,035 describes a method of combining two molded parts of different colors into one article by molding the first mold piece into a removable metal insert that constitutes the first part mold and using the removable mold as the insert in the second mold without removing the first part from the insert mold. The method recommends molding the second part while the first part is still warm to achieve proper bond between the first and second parts. This method provides no special methods of protecting the part from pressure or temperature other than to retain it in its original mold. It has the disadvantage that the first mold is large and cumbersome because of the necessity of fitting and being retained securely into the first injection molding step.

BRIEF SUMMARY OF THE PRESENT INVENTION

In the present invention there is provided a novel fastener capable of being insert molded into elastomeric foamed parts, such as seat buns, or into hard plastic parts such as cases, using standard injection or compression molding techniques without contaminating or destroying the hook projections due to intrusion of material onto the hooks or heat and pressure. As in the prior art products, my invention carries on one surface an area of outwardly extending fastener elements, preferably hooks. These fastening elements constitute one half of a touch fastening system. The other half of the fastening system is attached to the companion portion of the intended assembly. The outwardly extending fastener elements, however, are at least partially encased in an elastomeric compound, more specifically described below, which fills most (preferably all) of the void areas surrounding and protecting the engaging elements. This novel fastener appears as a sheet like structure completely void of protuberances. In this form it is possible to cut out strips or shaped segments from the sheet which can be placed into a mold to be molded into a plastic part. The elastomeric coating possess sufficient resistance to compression to protect the hooks against high pressures of the molding process and also provides insulation against transfer of heat from the molten injected plastic to melt the hooks of the fastener.

I have found it convenient to incorporate means for magnetic attraction within the elastomeric coating for holding the fastener against the magnets incorporated into the walls of the mold as is well known in the art. Such materials as iron filings or iron oxide or carbon steel strips are suitable for such purposes.

In this way is provided a fastener which is capable of withstanding the rigors of the most severe molding processes, such as injection or compression molding, at temperatures greater than the distortion temperature of the polymer forming the insert part.

After molding the elastomeric protective cover is removed from the fastener elements exposing the hooks. The protective cover, being elastic, is capable of being removed by several means. In its simplest form removal is achieved by simply yanking or pulling upon the sheet formed by the elastomeric compound. The elastomeric sheet is of such integrity and elasticity it can be pulled away from the hooks without distorting them or without breaking itself.

Other methods of removal are possible including injecting air through a needle inserted through the elastomeric protective coating to lift the coating off the engaging elements through pressure built up under the coating. In any event the exposed hooks at this point form an integral part of the plastic piece.

The companion portion of the assembly, containing on its inner surface companion fastening elements, loops for example, is affixed to the part by means of the incorporated mating elements. The hook and loop closure firmly holds the two components together providing a detachable means for combining the sections of the assemblage.

The fastener of this invention is also usable in molding situations such as the cold molding of urethane seat buns. It is convenient to apply the protective coating to the fastener material in wide sheets using coating or calendering techniques well known in the art. It is then possible to slit the wide product into long narrow strips which substitute readily for the more conventional well known strip fasteners molded into seat buns for attachment of trim covers to form a completed seat assembly. To create special shapes of fastener, desirable for more intricate designs in the seat I cut the wide sheet into various shapes, such as curves, chevrons, wings and the like, using methods well known such as rotary or steel rule dies.

BRIEF DESCRIPTION OF THE DRAWINGS

In order to more fully understand the invention, reference is made to the following detailed drawings.

DETAILED DESCRIPTION

Figure 1:
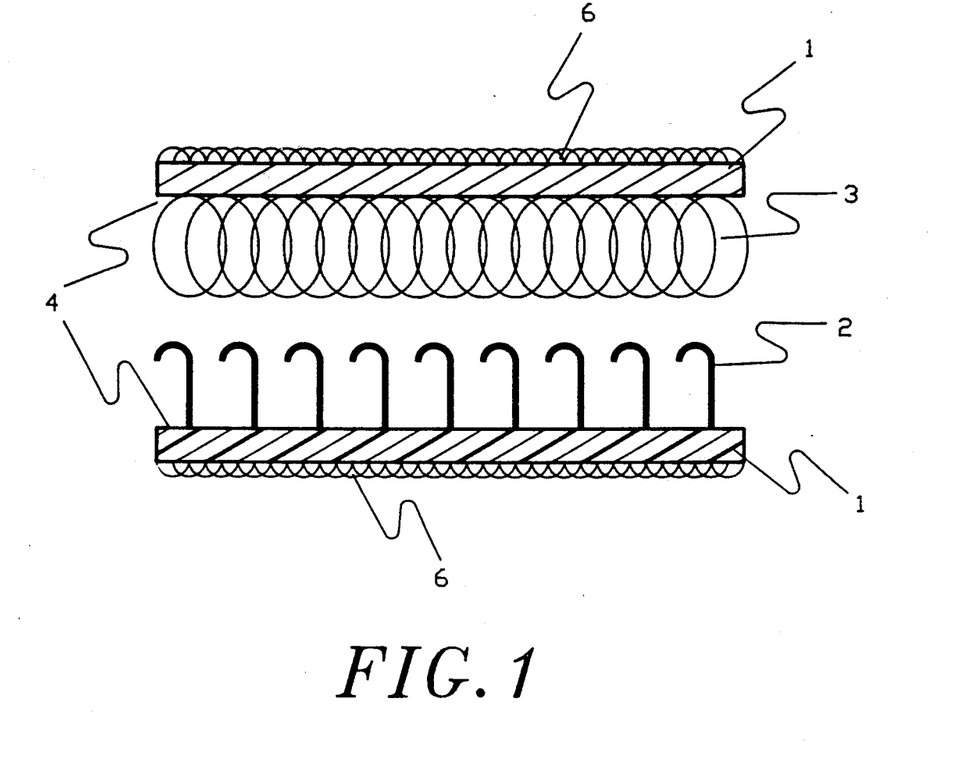
FIG. 1 is a cross section view of a hook fastener section of a hook and loop fastener closure.

FIG. 1 is a cross-sectional view of the two portions of a standard hook and loop tape 1 where the two portions are not engaged. Base 4 supports upstanding hooks 2 and loops 3. As the two portions are pressed together the hooks 2 penetrate loops 3 to releasably engage each side of the fastener. Backing 6 has been added to base 4 to serve as a tie layer for molding the fastener 1 into other objects such as plastic parts or elastomeric seat buns. Loops 3 and hooks 2 are customarily made from thermoplastic polymeric resins which are heat set to resiliently retain their shape during multiple openings and closings of the fastener. If the thermoplastic hooks or loops are subjected to high temperatures and/or high pressures the elements 2 or 3 will be crushed and rendered inoperable. If the temperature is raised near the softening point of the thermoplastic resin forming the fastener elements, the elements will distort or even melt if the temperature is sufficiently high. If at the same time great pressure is applied to the softened elements the entire assembly is crushed and the function of the fastener is destroyed.

A typical environment wherein such temperatures and pressures are encountered is in plastic molding such as injection molding, compression molding, casting, slush molding, powder molding, transfer molding, rotational molding and the like. Heretofore, it is not known to mold-in hook and loop fasteners directly into plastic parts using such methods because the molding process destroys the fastener elements.

Figure 2:
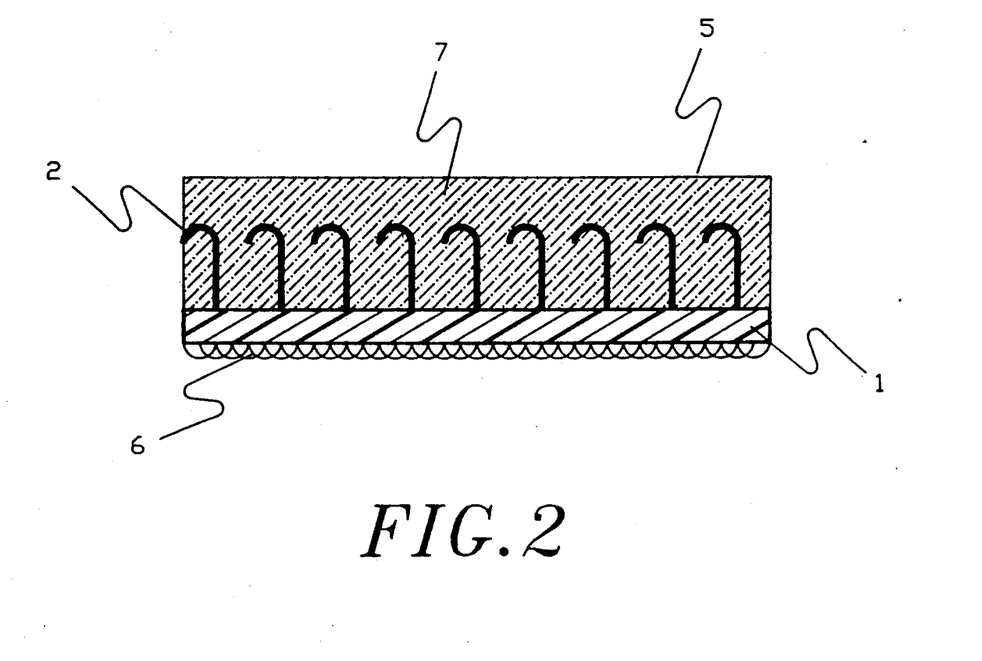
FIG. 2 is a cross section view of the fastener of FIG. 1 encased in the protective medium to create the product of the present invention.

FIG. 2 depicts a cross sectional view of the product of this invention wherein the above mentioned difficulties have been overcome by encasing the fastener elements 2 in an elastomeric coating 7 which completely surrounds the elements 2.

The elastomeric protection encasing the elements 2 can be selected from a wide variety of materials which operate to encapsulate and prevent contamination or destruction of the hook or loop projections during a rigorous plastic molding operation, while at the same time affording a coating that can be easily applied and removed from the projections without damage to their ultimate function as a separable fastener assembly.

Accordingly, elastomers are selected which have an initial application viscosity that facilitates the diffusion and penetration of the elastomer resin into the tiny irregularities of a hook and loop fastener. Both solvent cast and two-component curing elastomer systems are broadly contemplated, wherein the application viscosity of the former can be conveniently adjusted by controlling the weight percent of solid elastomer contained within a particular solvent system.

In the preferred embodiment of a two-component curing elastomer system, the individual liquid component viscosity becomes an important consideration for selecting the particular reactive combination. Accordingly, the uncured liquid components must combine to provide an application viscosity that first penetrates and encapsulate a fastener element, prior to eventual curing and formation of a solid encapsulating elastomeric medium.

Yet a further criterion for selection of the elastomers of the instant invention is to include those elastomers that are effective to keep molten or liquid plastic out of the fastener elements during a particular bound to the surface of the hooks or loops so that their removal might result in destruction of the fastener assembly. In connection with this objective, elastomers are selected which are known to be relatively unable to permanently adhere to the surface of a particular fastener element that they are then acting to encapsulate. It will also be appreciated that various additives can be combined with a particular elastomer so as to further minimize permanent bonding of the surface of the fastener with a particular encapsulating material.

Alternatively, in yet another broad aspect of this invention, the surface of the particular fastener may be treated with a release agent prior to being coated with an elastomer resin, which then facilitates the removal of the elastomer after the plastic molding cycle is complete. Furthermore, it will be appreciated that additives may be incorporated directly into the various materials employed to produce the fasteners themselves, which would also contribute to a reduction in the bonding between the fastener surface and the encapsulating resin.

Those elastomers that are particularly suited to reach the above objectives include silicone rubbers, but other suitable materials include, when properly compounded, natural rubber, urethane rubbers, or other elastomers well known in the trade. When properly applied onto a hook and loop fastener 1 the elastomer encases the elements 2 (or 3) around all sides and effectively holds the element 2 in place with respect to its base 4 and adjacent hooks 2. The encapsulating elastomer 7 acts as both a seal to keep molten or liquid plastic out of the hooks 2 or loops 3 during the molding cycle, and as a compression stay to cushion the hooks from the extreme pressures associated with plastic molding cycles, and as an insulation barrier from any heat distortion or melting.

Figure 3:
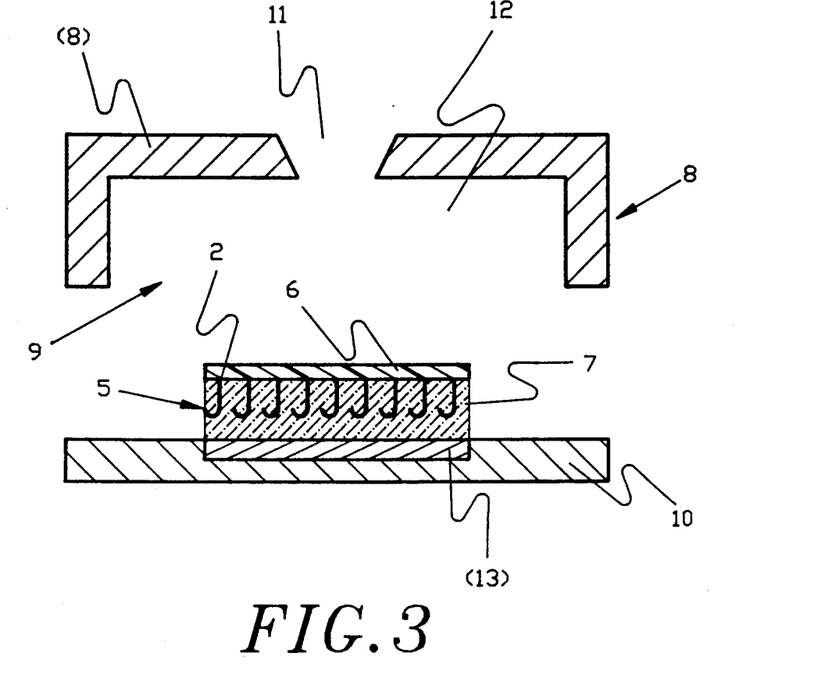
FIG. 3 is a cross section view of the protected closure portion of this invention placed in an injection mold with the mold faces apart.
Figure 3A:
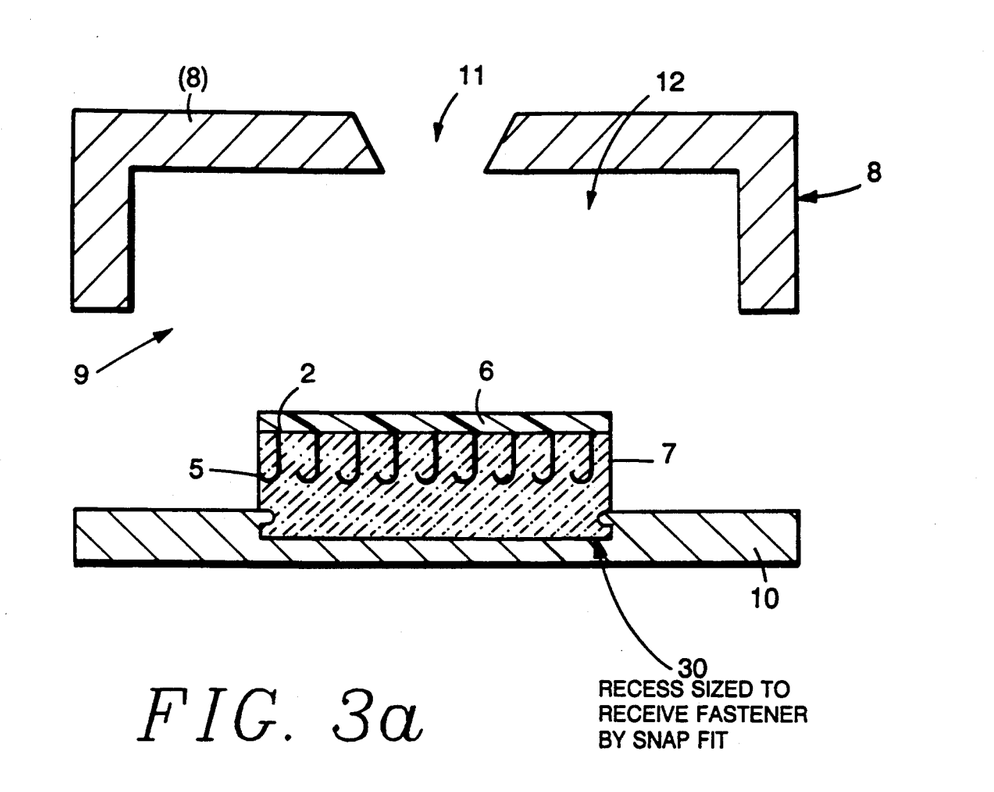
FIG. 3a is a cross sectional view of a fastener held in a mold by a rescue sized to receive the fastener by a snap fit.
Figure 4:
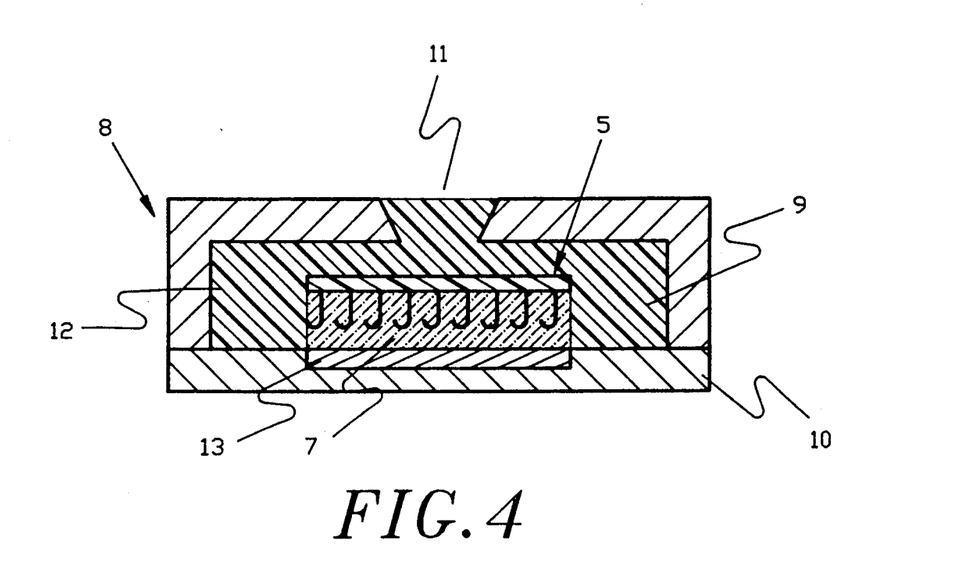
FIG. 4 is another cross sectional view of the mold of FIG. 3 but with the faces of the mold closed and receiving molten plastic from the injector screw.
Figure 5:
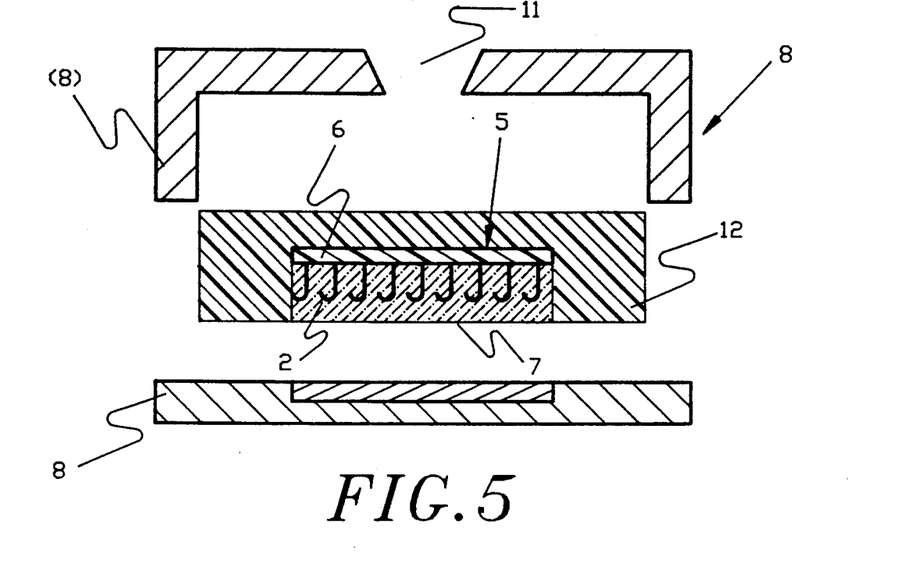
FIG. 5 is a view of the mold of FIG. 3 and 4 but with the mold once again opened and ready to discharge the molded part now containing the inserted part.
Figure 6:
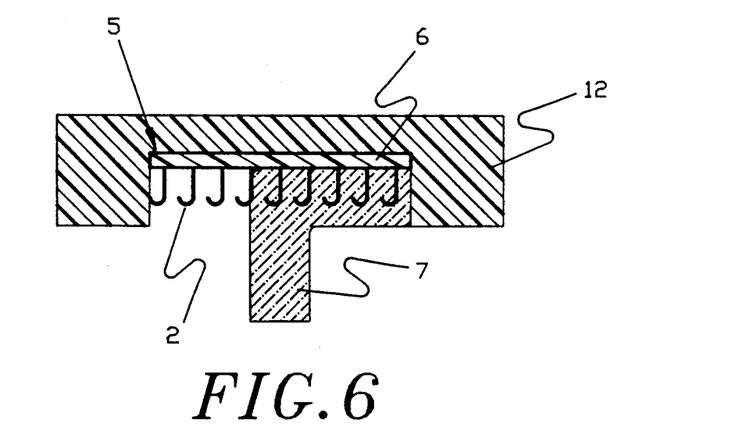
FIG. 6 is a cross section view of the molded plastic part showing the removal of the elastomeric protector from the hook portion of the part.
Figure 7:
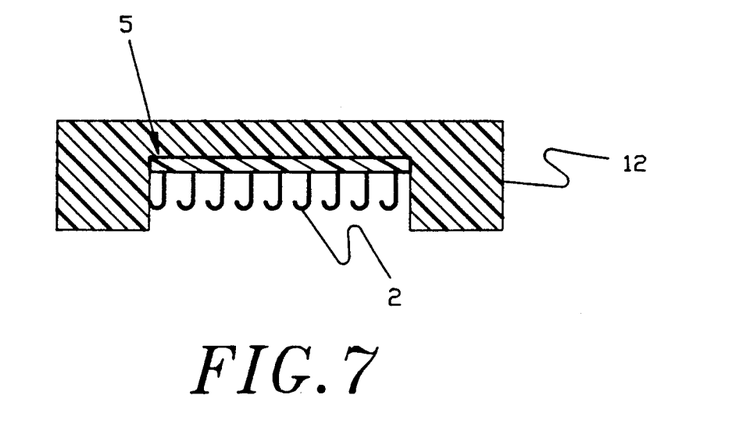
FIG. 7 is a cross section of a completed plastic part produced from the mold of FIG. 3.

FIG. 3 is a cross section view of a simple injection mold 8 showing cavity 9 and core plate 10 in the open position. Fastener 5 is inserted into a section of the core plate and held thereon by a magnet 13 which is made an integral part of the mold 8. Alternatively, as shown in FIG. 3a, fastener 5 can be retained in the wall of the mold by a recess 30 of appropriate size to accept the fastener by snap fit. To assure attraction between the magnet 13 and the fastener 5, elastomeric coating 7 contains, in addition to the elastomeric compound, iron particles that will be attracted to the magnet 13 and hold the fastener 5 in the desired location. FIG. 4 is a cross section representation of the mold 8 in the closed position where plastic has been injected into the cavity 9 through opening 11 to create the impression 12. FIG. 5 shows the next step in the molding process wherein the mold 8 is opened after the injected plastic has had time to solidify. At his point the part would be ejected from the mold 8. FIG. 6 depicts the step of removing the elastomeric protector 7 from the plastic part 12 to uncover fastening elements 2 or 3. FIG. 7 illustrates a cross section of the final piece 12 with hooks 2 aligned to receive loops from a companion piece (not shown) to detachably connect the assembly. The fastening elements are unaffected by the severe environment within the mold cavity and are in condition to perform their fastening function when joined together with the companion loop elements.

Figure 8:
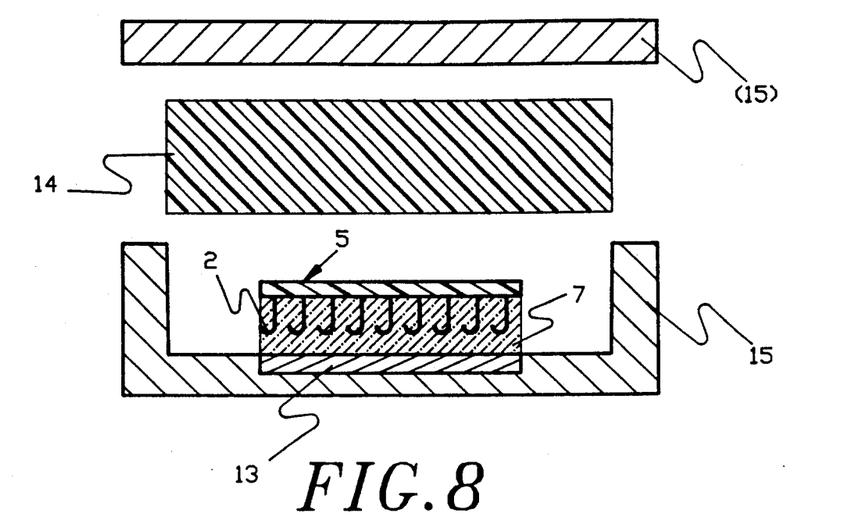
FIG. 8 through FIG. 10 depict the same sequence as FIG. 3 through FIG. 5 but for a compression mold machine rather than by injection molding.
Figure 9:
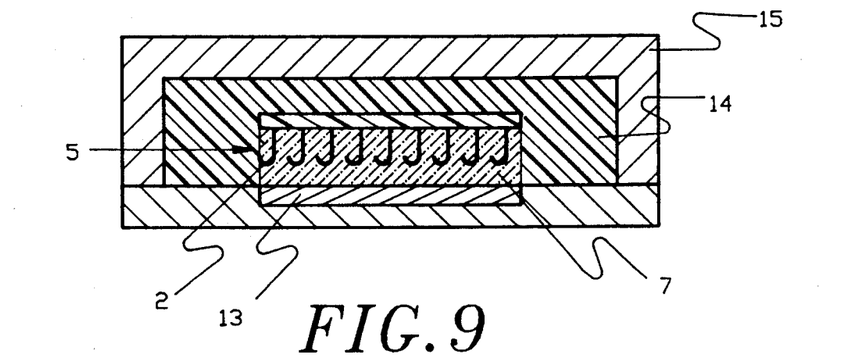
Figure 10:
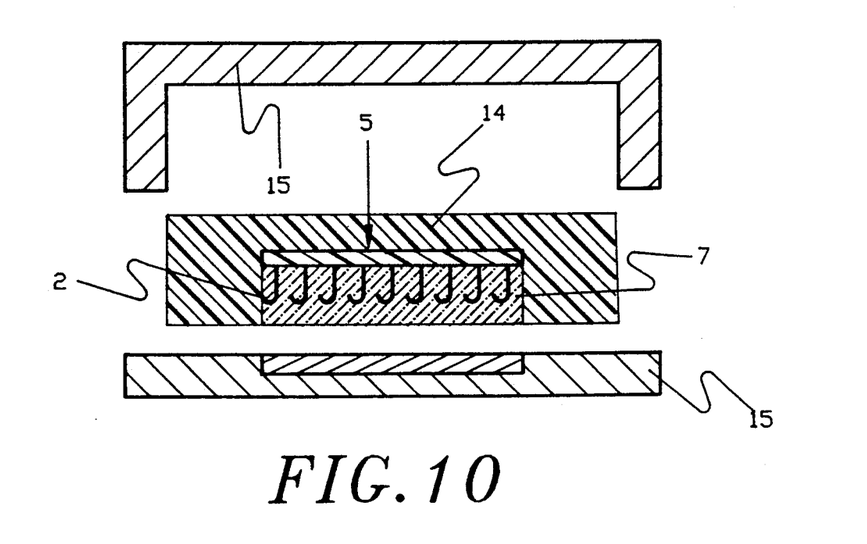

FIG. 8 through FIG. 10 depict the molding sequence involved in the compression molding process using the fastener of this invention. In FIG. 8, the protected fastener 5 has been attached to the mold 15 by magnet 13. A polymer slug 14 is charged to the mold 15 and the upper portion of the mold 16 closes against the slug 14 causing it to melt and flow into the unoccupied portions of the mold cavity. FIG. 10 illustrates the next step in the compression molding process whereby the mold 15 is opened exposing the piece 12 which is subsequently removed from the mold 15. The finished piece contains the fastener 5, with the elastomeric protector 7 still in place, integrally contained as a part of the finished molded piece 12. The elastomeric protector 7 is removed as shown in FIG. 6 and the part 12 is represented, as in the case of injection molding, by FIG. 7.

Figure 11:
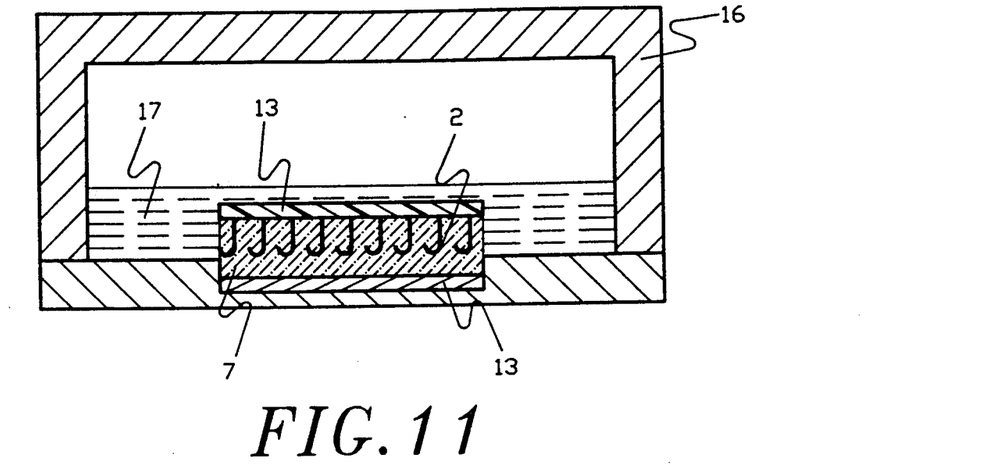
FIGS. 11 and 12 depict a fastener according to the invention being employed in a liquid plastic molding process wherein reactive chemicals are poured into the mold and react to form a solid foam object, e.g., foam seat buns for automobiles.
Figure 12:
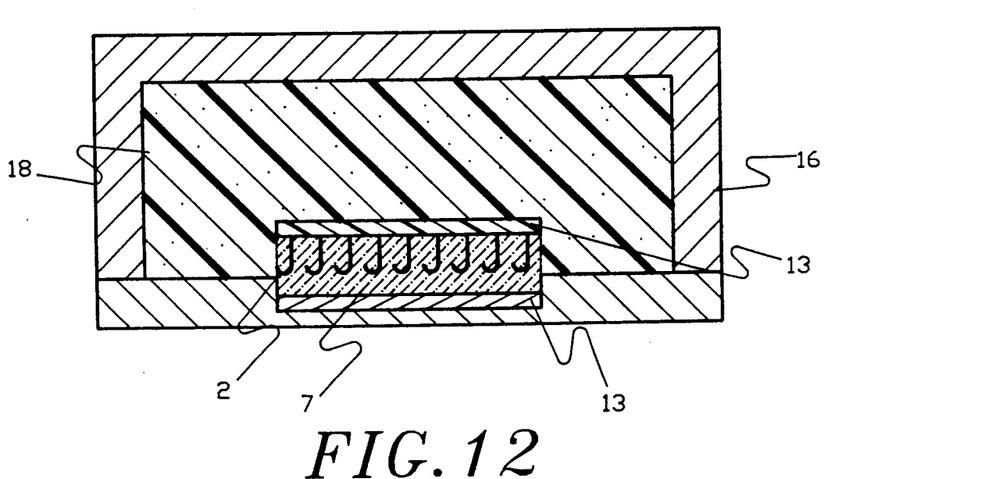
Figure 13:
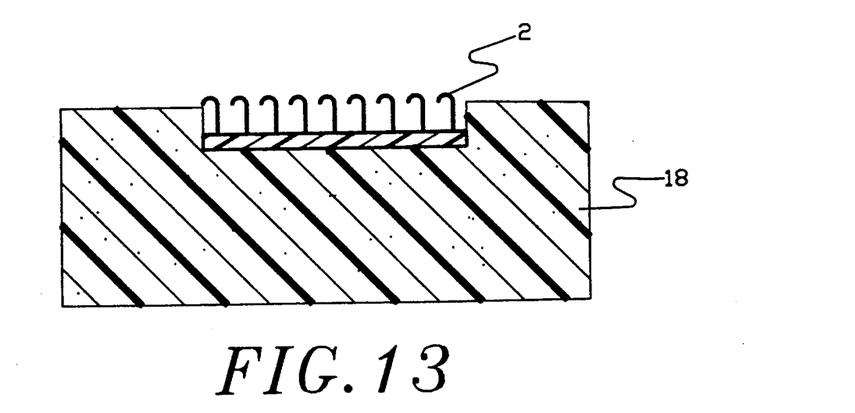
FIG. 13 shows a finished part, molded as shown in FIGS. 11 and 12, after the protective coating has been removed from the fastener.

FIG. 11 illustrates the use of my invention in a liquid molding process, such as is used for the manufacture of elastomeric seat buns for automobiles, wherein the plastic piece 18 (see FIG. 13) is formed by pouring reactive chemicals 17, such as polyol and diisocyanate, into a mold 16 and permitting the parts to react to form a solid foam object 18. Mold 16 is charged with an appropriate chemical mixture 17, well known in the art, covering a fastener element 1 possessing a protective cover 7. The fastener is held in the mold by magnetic attraction of a magnet 13 imbedded in the mold 16 upon iron particles incorporated into the protective coating, as described above. FIG. 12 shows the mold 16 after the chemicals 17 have reacted and filled the mold 16 to form the plastic part 18. FIG. 13 shows the finished part 18, for example a seat bun, with the fastener 1 positioned in place and integrally molded therein, after the protective covering 7 has been removed. It will be understood by those skilled in the art that in like manner any other method of forming plastic parts could be used to incorporate a hook and loop fastener into a solid flexible plastic part.

Figure 14:
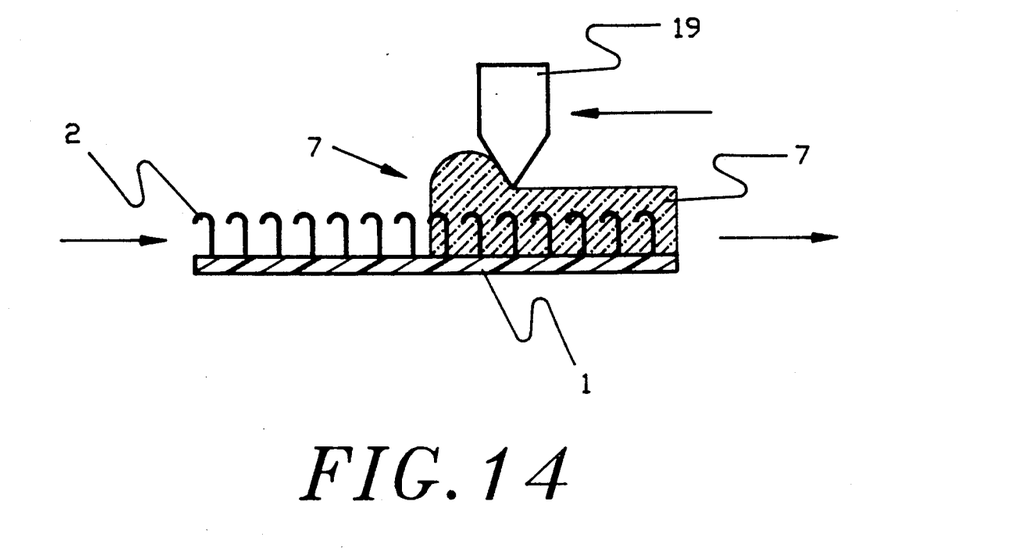
FIG. 14 shows a method of applying the elastomeric compound to the hook tape to encase the hooks for protection from high pressures and temperatures during the molding process.
Figure 15:
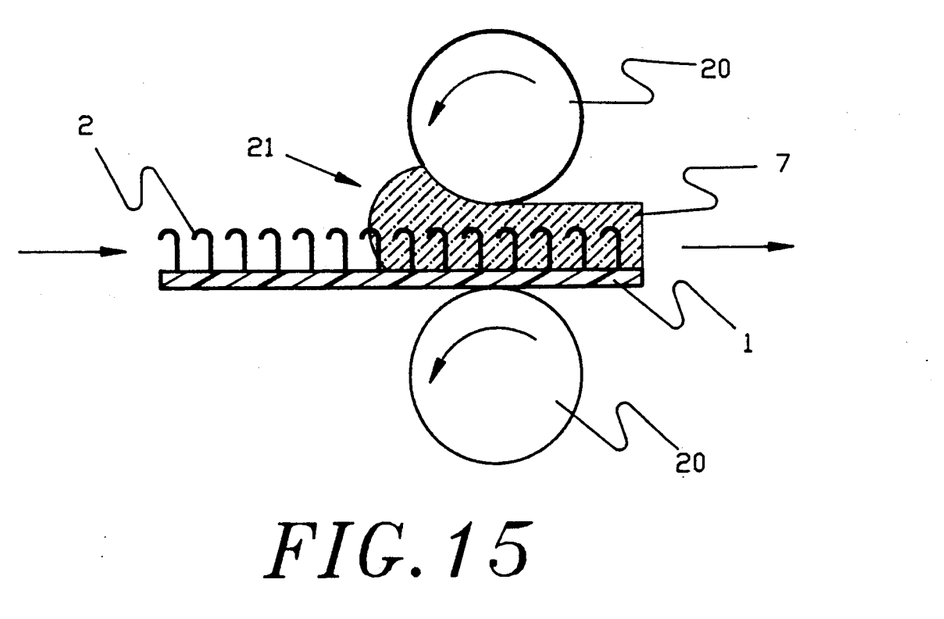
FIG. 15 shows an alternative method of applying the protective coating to the hook strip.

It can be readily appreciated by the foregoing discussion the essence of my invention is the application of the elastomeric coating into the engaging elements. Both the nature of the elastomeric compound and the method of application are important considerations in creating this novel fastener. FIG. 14 illustrates a method of applying a liquid composition 7 to the fastener elements of the instant invention. The fastener tape 1 is passed under the knife of a knife coater 19, well known in the art. The elastomeric compound 7 is evenly spread over and throughout the fastener elements 2. A compound composed of Silastic E, a two part room temperature vulcanizing silicone mixture sold by the Dow Corning Company, is ideally suited for application in this manner. After applying the liquid compound it is dried in an oven at 150 F. for 30 minutes. The fastener thus treated has a rubbery material completely encapsulating the fastening elements. A sheet of the coating has a tensile strength of 700 psi and an elongation of 400%. Other materials which are also well suited to this method of application include Conap Conathane (TU4011) a two part urethane mixture and Vinyl Plastisol (CS8-1303A) sold by Coating Systems, Inc. To each of these materials was added 25% by weight of Bayflex 316 iron oxide powder as the ferromagnetic material to cause attraction to the magnet incorporated in the wall of the mold. FIG. 15 illustrates a second method of applying an elastomeric coating to the fastener material to create the product of this invention. Calender coating is well known in the art and I have found it useful for the purposes of coating hook and loop materials. The uncoated fastener 1 is passed between calender rolls 20. An elastomeric compound 7 is applied into the nip 21 formed between the rolls 20. The elastomeric compound is evenly distributed throughout the engaging elements 2. The combination thus formed is cured in a manner appropriate for the specific compound used which will be more specifically understood by referring to the examples set forth below.

The resulting products are suitable for inclusion in injection molds by attaching to the magnet incorporated in the walls thereof and capable of withstanding the high temperatures and pressures of the molding process.

DESCRIPTION OF THE PREFERRED EMBODIMENT

The following examples will be illustrative of the execution of the method for manufacturing and use of the product of this invention.

EXAMPLE I

A length of the plastic hook portion of a hook and loop closure designated as Ultra-mate HTH 708 is extruded as described in Fisher U.S. Pat. No. 4,794,028. The resultant poly(propylene) layer containing about 750 hooks/in$^2$ was coated in a laboratory coater using Dow Corning Silistic E two part room temperature vulcanizing (RTV) silicone mixed in a 10:1 ratio of part "A" with part "B" as recommended by the chemical manufacturer. 25% by weight of Mobay Bayferrox 316 was added to the silicone mixture. The knife of the coater was set to a gap of 0.010" above the top surface of the hooks of the fastener tape for applying a first coating to the tape. The knife gap was adjusted to 0.025" above the top surface of the hooks to render the second coating smooth and more evenly distributed throughout the hooks. The coated tape was placed in a convection oven at 140 F. for 30 minutes. After removing from the oven and permitting to cool it was observed the silicone coating was easily removed from the hook elements with no noticeable distortion or diminution of their fastening ability. A sample, prepared as described, was cut into a section 1" by 1", and inserted into a recess of the same size cut to accommodate the fastener, in a plaque mold 1" by 4". A Zytel (nylon) injection grade plastic, sold by the Dupont Company, was injected into the mold at a nozzle temperature of 525 F. for 3 seconds at a pressure of 7000 psi with a hold time of 45 seconds. The plastic plaque thus formed was removed from the mold and the silicone coating on the fastener was mechanically pulled from the piece to expose the hooks. No damage to the hook could be observed.

EXAMPLE II

A length of the plastic hook portion of a hook and loop closure, designated as Ultra-mate HTH 708 poly(propylene), was coated in a laboratory coater using Dow Corning Silistic E, a two part room temperature vulcanizing (RTV) silicone mixed in a ratio of 10:1 as described above. 25% by weight of Mobay Bayferrox 316 iron oxide powder was added to the silicone mixture. Coating proceeded as in example I. A sample cut into a section 1" by 1", was inserted into a recess of the same size cut to accommodate the fastener, into a plaque mold 1" by 4". A poly(propylene) injection grade plastic, sold by the Dupont Company was injected into the mold at a nozzle temperature of 425 F for 3 seconds at a pressure of 12,000 psi with a hold time of about 30 seconds. the plastic plaque thus formed was removed from the mold and the silicone coating on the fastener was mechanically pulled from the piece to expose the hooks. No damage to the hooks could be observed.

EXAMPLE III

A plastic hook was extruded as in Example I but the plastic was a polyester based elastomer, CFM Hytrel 8238, sold by the Dupont Company. Laminated on the surface opposite the hook elements was a rayon nonwoven fabric, Pellon 850, sold by the Freudenberg Company. The fastener element thus formed was calender coated using a proprietary EPDM (ethylene-propylene rubber) material supplied by JPS elastomers division of the JPS Corporation who also carried out the calendering step. the EPDM coating with the fastener strip was 0.120 inches thick and 12 inches wide. Samples of the coated fastener were die cut into shaped pieces approximately 1" wide making a smooth curve with inner radius of 20 inches and a total length of approximately 8 inches. The part thus cut was placed in a clamshell mold used to make seat buns incorporating a pedestal containing a magnet on its upper surface to hold the piece with the elastomeric coating facing downward and in intimate contact with the top surface of the pedestal. A standard charge of liquid chemicals, including a diisoocyanate and a polyol, were introduced into the mold. The upper half of the mold was closed and the chemicals allowed to react to create a foam which filled the cavity of the mold. The mold was opened and seat bun removed. The EPDM elastomeric covering of the hooks was removed by gripping one end of the elastomer and pulling the coating from the fastener. The coating pulled away from the hooks of the fastener without difficulty to expose the hooks. There was no noticeable tendency to pull the fastener from the soft urethane foam and the hooking elements were perfectly clear and free of any chemical. No damage or distortion of the hooks could be observed.

We claim:

1. A method for inserting separable fasteners of the hook and loop type into plastic parts comprising the steps of:
   (a) coating the fastener to cover and intimately surround and encase the engaging elements with a protective means of an elastomeric composition which protects against the pressure and temperature of molding;
   (b) inserting the coated fastener into a mold containing means for holding the fastener;
   (c) injecting the mold with molten plastic;
   (d) opening the mold to remove the plastic part thus formed; and
   (e) removing the protective coating from the fastener elements to render the elements ready to engage elements on the companion portion of the hook and loop fastener.

2. The method of claim 1 wherein the protective means is an elastomeric composition which is cured in place.

3. The method of claim 2 wherein the elastomeric composition is selected from the class of materials which have an initial viscosity permitting full penetration and encasing of the engaging elements and which are cureable to an elastomeric film.

4. The method of claim 2 wherein the elastomeric composition has a tensile strength of at least 500 pound per square inch and an elongation of at least 300%.

5. The method of claim 1 wherein the means for attaching the fastener in the mold is a magnet and the protective means contains magnetizable means.

6. The method of claim 5 wherein the magnetizable means is a ferromagnetic substance.

7. The method of claim 1 wherein the means for holding the fastener onto the wall of the mold is a recess of appropriate size to accept the fastener by snap fit.

8. The method of claim 1 wherein the protective means is a flowable coating which is curable to a protective elastomer which elastomer does not adhere to said engaging elements.

9. The method of claim 8 wherein the protective means serves as a compression stay to cushion the engaging elements from pressure exerted during the molding cycle.

10. The method of claim 8 wherein the engaging elements are treated with a release agent.

11. The method of claim wherein the engaging elements contain a material which prevents adhesion of the elastomer.

12. A method of forming an intermediate product comprising a molded object incorporating engaging elements of a hook and loop fastener system, the method which comprises coating the engaging elements so as to cover and intimately surround the elements by a removeable elastomer.

* * * * *

UNITED STATES PATENT AND TRADEMARK OFFICE
CERTIFICATE OF CORRECTION

PATENT NO. : 5,286,431
DATED : February 15, 1994
INVENTOR(S) : Donald L. Banfield, et. al.

It is certified that error appears in the above-indentified patent and that said Letters Patent is hereby corrected as shown below:

Column 1, Line 6 replace "May 5" with --May 3-- to read:
"May 3, 1991"
Column 4, Line 33 replace "rescue" with --recess-- to read:
"a recess sized to receive..."

Signed and Sealed this

Thirteenth Day of December, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,286,431
DATED : February 15, 1994
INVENTOR(S) : Banfield et al.

It is certified that error appears in the above-indentified patent and that said Letters Patent is hereby corrected as shown below:

Column 10, Line 36 insert "8" after "The method of claim" to read:
"The method of claim 8 wherein..."

Signed and Sealed this

Fourteenth Day of April, 1998

Attest:

BRUCE LEHMAN

*Attesting Officer*  *Commissioner of Patents and Trademarks*